United States Patent [19]

Chou

[11] Patent Number: 4,782,845

[45] Date of Patent: Nov. 8, 1988

[54] DOUBLE-LOCKING ADJUSTABLE BRACE

[76] Inventor: Lung-Chiao Chou, 1, Alley 9, Lane 250, Cheng Kung Rd., Sec. 2, Nei Hu, Taipei, Taiwan

[21] Appl. No.: 122,302

[22] Filed: Nov. 18, 1987

[51] Int. Cl.$^4$ .............................................. A45B 9/00
[52] U.S. Cl. .................................... 135/75; 248/354.3
[58] Field of Search ................. 135/69, 75; 248/354.3, 248/354.6

[56] References Cited

U.S. PATENT DOCUMENTS

| | | | |
|---|---|---|---|
| 2,532,168 | 11/1950 | Jakoubek | 248/354.3 |
| 2,671,680 | 3/1954 | Stevens | 248/354.6 |
| 2,747,829 | 5/1956 | Schubert | 248/354.3 |
| 4,582,079 | 4/1986 | Fields | 135/75 |

FOREIGN PATENT DOCUMENTS

| | | | |
|---|---|---|---|
| 145096 | 6/1985 | European Pat. Off. | 135/75 |
| 1052635 | 3/1959 | Fed. Rep. of Germany | 135/75 |
| 1389564 | 1/1965 | France | 248/354.3 |

Primary Examiner—J. Karl Bell
Attorney, Agent, or Firm—Varndell Legal Group

[57] ABSTRACT

This invention relates to a double-locking adjustable brace especially one which comprises an inner rod, an outer tube, a locking device consisting of two cams, two brake shoes. A spring and a driven plate, and a torsion reducer consisting of a plastic cover, a pivot screw and a concave support. The inner rod is telescopically fitted in the outer tube so that the brace is adjustable in length. The inner rod disengages and engages one of the cams by means of internal and external toothings so that the cams of the locking device can be turned to expand and make the brake shoes to grip the outer tube. The torsion reducer consists of a special washer, a screw pivot, a metal support and a plastic cover and is constructed in such way that the plastic cover can turn freely on the screw pivot to reduce the torsion incidentally applied on the brace.

3 Claims, 2 Drawing Sheets

DOUBLE-LOCKING ADJUSTABLE BRACE

BACKGROUND AND SUMMARY OF THE INVENTION

Braces like walking sticks and shuttering struts have been widely used to resist pressure in the direction of their length. But most conventional braces are fixed in length and can not be adjusted to meet the requirement of different heights of the shutterings and the persons who use walking sticks. So walking sticks and shuttering struts of different sizes must be made to meet the requirements. Furthermore, the number of sizes is limited and sometimes no suitable sizes is available. Although telescopic braces have been introduced, they are fixed by pressing their inner tube with screws in their outer tube. Such grip is not firm and release is inevitable under shock or torsion.

In view of the above disadvantages, the present invention was developed. So the main object of this invention is to provide a double-locking adjustable brace which comprises an inner rod, outer tube and locking device and is constructed in such way that the inner rod can be turned to make the locking device grip the outer tube firmly without failure.

Another object of this invention is to provide a double-locking adjustable brace which has a torsion reducer consisting of a screw pivot, metal support and plastic cover and is constructed such that the plastic cover can turn freely on the screw pivot to reduce the torsion incidentally applied on the brace.

DETAILED DESCRIPTION OF THE PREFERRED EMBODIMENT

Figure 3:
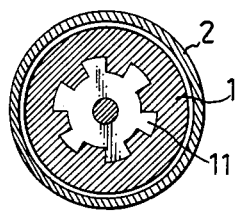
FIG. 3 is a cross section taken along the line 3—3 in FIG. 2.
Figure 4:
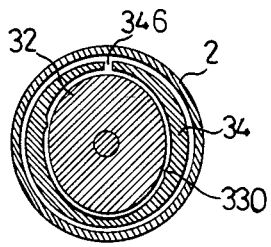
FIG. 4 is a cross section taken along the line 4—4 in FIG. 2.
Figure 2:
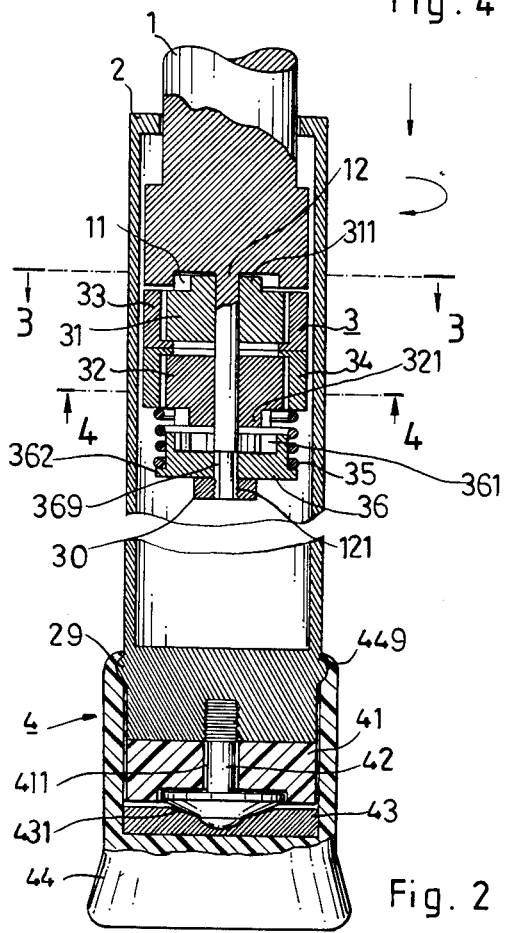
FIG. 2 is vertical section of the said brace.
Figure 1:
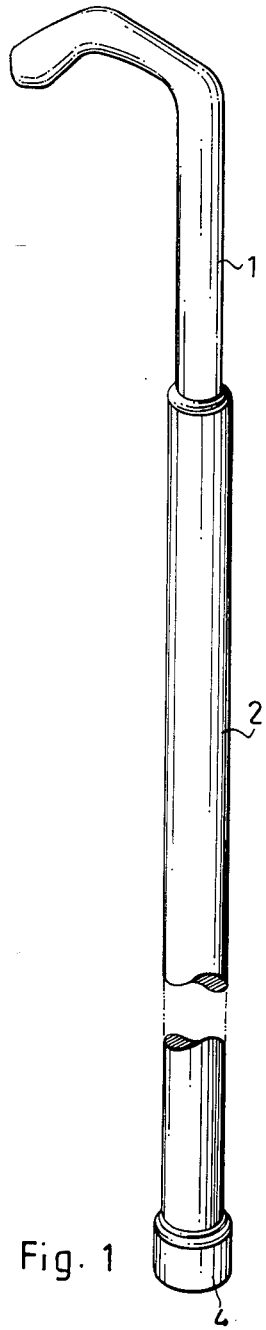
FIG. 1 is a vertical view of the double-locking adjustable brace of this invention.

Referring now to the drawings, the nature of the present invention used as a walking stick is described in detail as follows:

As shown in FIGS. 1 and 2, the double-locking adjustable brace of this invention comprises an inner rod 1, an outer tube 2, a locking device 3 and a torsion reducer 4. The inner rod 1 is telescopically fitted in the outer tube 2 and has an inner toothing 11 in its head which has the same diameter as the brake shoe 33 of the locking device 3, and a flat ended bolt 12 extending from the center of the internal toothing 11 for the locking device 3 to fit on. The locking device 3 consists of two sets of cams 31, 32 and brake shoes 33, 34, a spring 35, a driven plate 36, and a nut 30. The driven plate 36 has a slot 369 for the threaded flat end of the bolt 12 to fit in, and is fixed on the flat end of the bolt 12 by the nut 30. The driven plate 36 also has an internal toothing 361 in the top side and a projecting rim 362 on the bottom. Two sets of cams 31, 32 and brake shoes 33, 34 are fitted on the bolt 12 between the head of the inner rod 1 and the driven plate 36. The cams 31, 32 have external toothings 311, 321 corresponding to the internal toothings 11, 361 of the inner rod 1 and driven plate 36. The brake shoes 33, 34 are round externally to fit the internal wall of the outer tube 2 and oval internally to cope with the cams 31, 32. The brake shoes 33, 34 has projections 330 on the thicker walls and splits 336, 346 in the thinner walls so that they can be expanded by the cams 31, 32 to press against the internal walls of the outer tube 2. The spring 35 fitted on the driven plate 36 against the projecting rim 362 keeps the second cam 32 and brake shoe 34 off the driven plate 36 and makes the first cam 31 engage the inner rod 1 in normal time so that the locking device 3 can move with the inner rod in the outer tube 2. The torsion reducer 4 consists of a special washer 41, a round head screw pivot 42, a plastic cover 44 and a metal support 43. The special washer 41 has a counter sink and hole 411 for the round head screw pivot 42 to fit in and is fixed to the bottom of the outer tube 2. The metal support 43 is set in the plastic cover 44 and has a concavity 431 to receive the round head of the screw 42. The plastic cover 44 has a circular groove 449 at the opening in corresponding with the circular projection 29 formed on the bottom of the outer tube 2 as a means to retain the plastic cover 44 after being fitted thereon. These elements are composed in such way that the plastic cover 44 can turn freely on the round head screw pivot 42. So when the walking stick is twisted by hand with the lower end against the ground, only the plastic cover 44 will turn and the outer tube 2 will not turn to release the inner rod 1 locked by the locking device 3.

Figure 6:
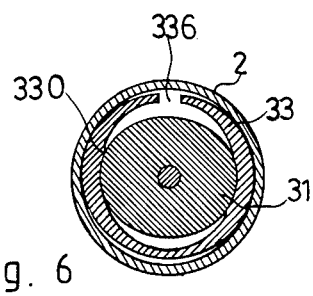
FIG. 6 is a cross section taken along the line 6—6 in FIG. 5.
Figure 7:
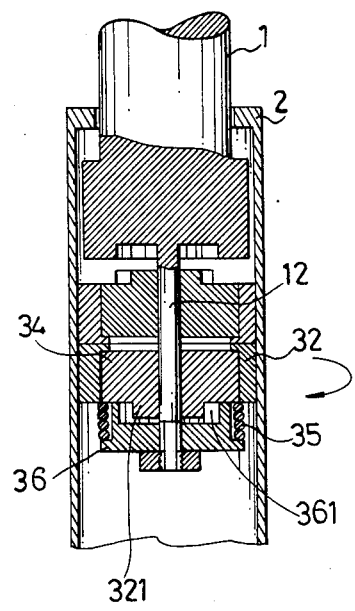
FIG. 7 illustrates the locking of the second part of the said locking device.
Figure 5:
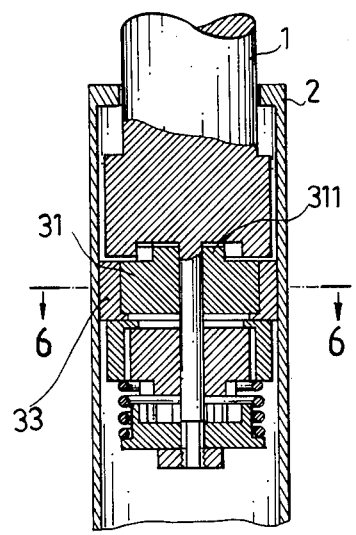
FIG. 5 illustrates the locking of the first part of locking device of the said brace.

In application, the length of the walking stick is first decided as required and the inner rod 1 and outer tube 2 are turned in different directions. With the turning of the inner rod 1, the first cam 31 engaged with the inner rod 1 by means of the internal and external toothings 11, 311 as shown in FIG. 3 turns to expand and make the first brake shoe 33 to grip the outer tube 2 as shown in FIGS. 5 and 6. Then, the inner rod 1 is pulled upward against the force of the spring 35 to disengage the first cam 31 and to make the external toothing 361 of the driven plate 36 engage the internal toothing 321 of the second cam 32, and turned to drive the second cam 32 to expand and make the second brake shoe 34 to grip the outer tube 2 as shown in FIG. 7. Thus, the inner rod 1 and the outer tube 2 are fixed by double locking and the locking device can be used for locking any telescopic strut in adjusting the length.

I claim:

1. A double-locking adjustable brace comprising an inner rod, an outer tube: a locking device and a torsion reducer; said inner rod having an internal toothing in the head and a flat-ended bolt extending from the center of the internal: toothing for the locking device to fit on; said outer tube fitted on the inner rod and having a circular projection corresponding to the circular groove of the plastic cover of the torsion reducer to absorb the torsion of the inner rod after being locked so as to prevent the outer tube from being released; said locking device providing the telescopic inner rod and outer rod with double locking and easy adjusting.

2. A double-locking adjustable brace according to claim 1 wherein the locking device consists of a spring, a driven plate and two sets of cams and brake shoes; said driven plate fitted on the flat part of the bolt has a projecting rim and an internal toothing; said sets of cams and brake shoes are fitted on the flat ended bolt between the head of the inner rod and the driven plate; said cams have external toothings corresponding to the internal toothings of the inner rod and driven plate; said brake shoes fitted around the cams in the outer tube have splits to form unclosed rings, which are round externally and oval internally, and projections on the thicker walls; said spring is fitted on the driven plate between the projecting rim and the second cam and brake shoe to keep the cam and shoe off the driven plate and make the first cam engage the head of the inner rod so that when the inner rod is pulled upward, the first cam will disengage the head of the inner rod and the second cam will engage the driven plate. Thus the cams can be turned respectively to expand and make the brake shoes to grip the outer tube.

3. A double-locking adjustable brace according to claim 1 wherein the torsion reducer consists of a special washer, a screw pivot screwed on the bottom of the outer tube, a plastic cover fitted on the outer tube, and a metal concave support set in the cover, and is constructed in such way that the plastic cover can turn freely on the round head screw pivot.

* * * * *